United States Patent Office 2,913,458
Patented Nov. 17, 1959

2,913,458
NEW THIOXANTHONES

Jean Druey, Riehen, and Konrad Meier, Basel, Switzerland, assignors to Ciba Pharmaceutical Products Inc., Summit, N.J.

No Drawing. Application October 17, 1957
Serial No. 690,608

Claims priority, application Switzerland August 19, 1955

12 Claims. (Cl. 260—247.1)

This invention relates to new thioxanthones. More particularly the invention concerns 1-aza-2-lower alkyl-6 - (tertiary - amino - lower alkylamino) - 9 - methyl - thioxanthones, containing at most one further substituent in the thioxanthone ring, said substituent being a methyl group in 4-position, and salts thereof. The tertiary amino group is preferably an amino group disubstituted by lower alkyl or hydroxalkyl groups, e.g. the dimethylamino, diethylamino, dibutylamino or hydroxy ethyl-butylamino group, or a pyrrolidino, piperidino or morpholino group. Lower alkyl groups are for example methyl, ethyl, propyl or butyl. A specific group of compounds of the invention are the 1-aza-2-lower alkyl-6-di-lower alkylamino-lower alkylamino-9-methyl-thioxanthones such as 1 - aza - 2 - lower alkyl - 6 - diethylaminoethylamino - 9-methyl-thioxanthones, and more particularly 1-aza-2-methyl - 6 - diethylamino - ethylamino - 9 - methyl - thioxanthone, and the therapeutically useful acid addition salts thereof. However, the preferred embodiment of the invention are the 1-aza-2,4,9-trimethyl-6-di-lower alkylamino-lower alkylamino-thioxanthones, and of this group the specific compound 1-aza-2,4,9-trimethyl-6-diethylaminoethylamino-thioxanthone, and the therapeutically useful acid addition salts of these compounds.

The new compounds exhibit a pronounced effect against Schistosoma and Amoebae and can be applied as medicaments in cases of human schistosomiasis and amoebiasis. Compared with the known 1-aza-6-diethylaminoethylamino-9-methyl-thioxanthone, they possess especially valuable properties.

The new compounds are obtained when 1-aza-2-lower alkyl-6-chloro-9-methyl-thioxanthones containing at most one further substituent in the thioxanthone ring, said substituent being a methyl group in 4-position are reacted with (tertiary amino)-lower alkylamines, as for example diethylamino-ethylamine.

The reaction is carried out in a manner known per se in the presence or absence of diluents and/or condensing agents and/or catalysts, preferably at elevated temperature.

A specific and preferred embodiment of the invention consists in heating 1-aza-2,4,9-trimethyl-6-chloro-thioxanthone with an excess of diethylamino-ethylamine, distilling off the excess of the amine, dissolving the residue in aqueous acetic acid, rendering the acid solution alkaline and extracting it with methylene chloride from which after washing with water and evaporation 1 - aza - 2,4,9 - trimethyl - 6 - diethylamino - ethylamino - thioxanthone is obtained.

Depending on the method of working, the new compounds are obtained in the form of the bases or corresponding salts. From the salts, in the manner known per se, the free amine bases can be prepared. Conversely, from the latter, by reaction with acids suitable for the formation of therapeutically useful acid addition salts, salts can be produced, as for example those of the hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxy ethane sulfonic acid, benzene or toluene sulfonic acid or therapeutically active acids.

Those starting materials which are new can be prepared by conventional methods.

The new compounds can be applied as medicaments for example in the form of pharmaceutical preparations which contain them or their salts in admixture with a pharmaceutical organic or inorganic, solid or liquid carrier material suitable for enteral, or parenteral administration. For the formation of such preparations such other substances are concerned as do not react with the new compounds, as for example water, gelatine, lactose, starch, magnesium stearate, talcum, vegetable oils, benzyl alcohols, gums, polyalkylene glycols, petroleum jelly, cholesterol or other known medicament carriers. The pharmaceutical preparations can be made up, for example, in the form of tablets, dragees, or in liquid form as solutions, suspensions or emulsions. If desired they are sterilized and/or may contain auxiliary substances such as preservative, stabilizing, wetting or emulsifying agents, salts for varying the osmotic pressure or buffer substances. They can also contain other therapeutically valuable substances. The preparations are obtained according to customary methods.

For example tablets of the following composition can be prepared in the ordinary manner:

| | Mg. |
|---|---|
| 1 - aza - 2,4,9 - trimethyl - 6 - diethylaminoethylamino-thioxanthone hydrochloride | 250 |
| Filler, consisting of lactose, colloidal silicic acid and tertiary calcium phosphate | 220 |
| Disintegrator, consisting of wheat starch and arrowroot | 97 |
| Lubricant, consisting of talc and magnesium stearate | 33 |
| | 600 |

This application is a continuation-in-part of our co-pending applications Serial No. 605,227, filed August 20, 1956 and Serial No. 629,245, filed December 19, 1956, both now abandoned.

The following examples illustrate the invention:

*Example 1*

13.8 grams of 1-aza-2:9-dimethyl-6-chloro-thioxanthone in 60 cc. of diethylaminoethylamine are heated under gentle reflux for 5 hours at 160° C. The excess of the diamine is then distilled off and the residue treated with 100 cc. of 10 percent acetic acid. The solution is extracted by shaking with a little ether, separated from the ether and after filtration over charcoal, rendered basic with potassium carbonate. The free base is extracted with ether. After washing with water and evaporation, the ether solution leaves as residue the yellow, crystalline base. From alcohol 1-aza-2-methyl-6-diethylaminoethylamino-9-methyl-thioxanthone of the formula

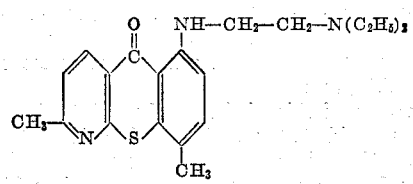

is obtained in golden yellow needles of melting point 83–84° C. Yield 16 grams. The hydrochloride forms yellow needles of melting point 229–229.5° C.

The 1-aza-2,9-dimethyl-6-chloro-thioxanthone can be prepared in the following manner:

64 grams of 2-chloro-3-cyano-6-methyl-pyridine are boiled under reflux for 16 hours with 83.5 grams of the dry sodium compound of 2-methyl-5-chloro-thiophenol in 500 cc. of dioxane. The product is filtered from common salt, the residue after evaporating dissolved in methylene chloride and the solution washed with water, dried and evaporated. The residue consisting of 6-methyl - 3 - cyano - 2 - (5' - chloro - 2' - methyl - phenyl-thiol) - pyridine of melting point 110–111° C. is recrystallized from methanol. Yield 98 grams.

27.45 grams of the nitrile are heated for 12 hours to 140–150° C. in 200 cc. of 80 percent sulfuric acid. The product is then poured on ice, adjusted to pH 3 with 10 N-caustic soda solution and extracted with methylene chloride. On distilling off the methylene chloride there remains crystalline 6-methyl-3-carboxy-2-(5'-chloro-2'-methylphenylthiol)-pyridine of melting point 167–169° C. Yield 24 grams.

29.35 grams of this carboxylic acid in 150 cc. of concentrated sulfuric acid are heated for 2 hours to 140–150° C. The product is then poured on ice, rendered alkaline with 10 N-caustic soda solution and extracted with methylene chloride. The residue obtained after distilling off the methylene chloride is recrystallized from dioxane. The 1-aza-2,9-dimethyl-6-chloro-thioxanthone melts at 204–206° C. Yield 21.4 grams.

*Example 2*

12.5 grams of crude 1-aza-2-isobutyl-6-chloro-9-methyl-thioxanthone are refluxed with 50 cc. of diethylethylenediamine for 6 hours. The excess diamine is then distilled off in vacuo and the residue dissolved in 200 cc. of acetic acid of 10 percent strength. While being stirred and cooled with ice, the orange-yellow solution is rendered alkaline by means of 2 N-caustic soda solution which is added dropwise. The golden yellow base precipitates in the form of crystals. The product is filtered off with suction, washed with water and dried in vacuo at 60° C. the 1-aza-2-isobutyl-6-diethylamino-ethylamino-9-methyl-thioxanthone of the formula

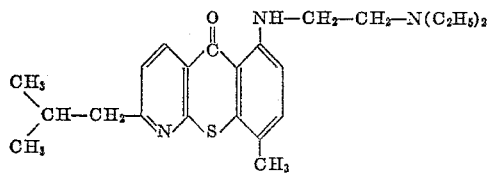

melts at 88° C. The yield is 15 grams.

To prepare the hydrochloride, the base is dissolved in alcohol mixed with the calculated quantity of alcoholic hydrochloric acid, and the solution concentrated. The hydrochloride crystallizes in the form of golden yellow matted needles of melting point 195–196° C.

The 1-aza - 2 - isobutyl-6-chloro-9-methyl-thioxanthone used as starting material can be obtained in the following manner:

19.45 grams of 2-chloro-3-cyano-6-isobutyl pyridine are boiled under reflux for 20 hours with 18.8 grams of the sodium compound of 2-methyl-5-chloro-thiophenol in 300 cc. of absolute toluene. Water is then admixed, the toluene solution separated, washed with 2 N-caustic soda solution and water, and the toluene distilled off. The 6 - isobutyl - 3 - cyano - 2 - (5' - chloro - 2' - methyl-phenyl-thiol)-pyridine distills at 158° C. under 0.09 mm. pressure of mercury to give a nearly colorless oil. The yield is 16.5 grams.

15.8 grams of this nitrile are heated to 140–150° C. for 5 hours with 150 cc. of sulfuric acid of 80 percent strength. The mixture is then poured on to ice, given a pH of 3–4 with concentrated ammonia while being cooled with ice, and the precipitated carboxylic acid filtered off with suction. For purification it is dissolved while warm in dilute excess sodium bicarbonate solution, the solution filtered with charcoal, and the acid precipitated again with 2 N-hydrochloric acid. In this manner there are obtained 15.1 grams of crude 6-isobutyl-3 - carboxy - 2 - (5' - chloro - 2' - methyl - phenyl-thiol)-pyridine. After repeated recrystallation from dilute alcohol, the pure product melts at 157–158° C.

14 grams of this carboxylic acid are heated to 140–150° C. for 5 hours with 300 grams of polyphosphoric acid. The mixture is then poured onto ice and the reaction product extracted with methylene chloride. The methylene chloride solution is washed with dilute caustic soda solution and water and evaporated. There remain behind 13.25 grams of 1-aza-2-isobutyl-6-chloro-9-methyl-thioxanthone in the form of a brownish oil which crystallizes slowly. The product is used without further purification.

*Example 3*

6.88 grams of 1-aza-2,9-dimethyl-6-chlorothioxanthone are boiled under reflux with 50 cc. of dimethylaminopropylamine for 11 hours. The excess of diamine is then distilled off in vacuuo, the residue is dissolved in 50 cc. of acetic acid of 10% strength, the solution is filtered with carbon and then adjusted to a pH value of 8 with 2 N-solution of caustic soda. The precipitated base is taken up in ether, the ethereal solution is washed with water, dried and evaporated. The resulting 1-aza-2,9-dimethyl-6-dimethylamino-propylamino-thioxanthone of the formula

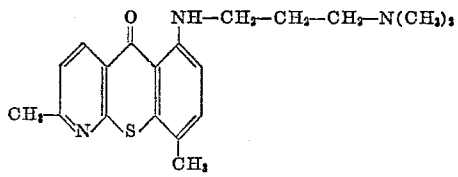

melts at 95–96° C. when recrystallized from acetone. The hydrochloride obtained in the usual manner melts at 226–228° C. Yield: 7.3 grams.

*Example 4*

6.88 grams of 1-aza-2,9-dimethyl-6-chlorothioxanthone are boiled under reflux with 50 cc. of morpholino-ethylamine for 12 hours. After distilling off the excess base, the residue is dissolved hot in 200 cc. of acetic acid of 10% strength, the solution is filtered with carbon and, after cooling, the base is precipitated with ice-cooling and stirring by the addition of dilute caustic soda solution in the form of crystals. The precipitate is suction-filtered, washed neutral with water and dried in vacuo. The 1-aza-2,9-dimethyl-6-morpholino-ethylamino-thioxanthone of the formula

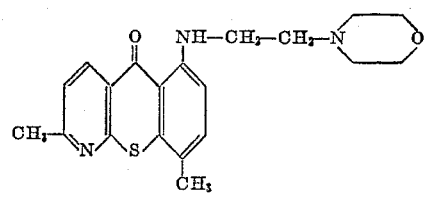

melts at 135.5–136.5° C. when recrystallized from acetone.

The hydrochloride prepared in the usual manner crystallizes from a mixture of water and acetone in the form of yellow, matted needles melting at 280–282° C. Yield: 6 grams.

*Example 5*

9 grams of 1-aza-2,4,9-trimethyl-6-chlorothioxanthone are boiled under reflux in 40 cc. of diethylaminoethylamine for 5 hours at 160° C. The excess of the diamine is distilled off under vacuum, the residue dissolved in 200 cc. of 10% acetic acid, the solution filtered over "Celite" (registered trademark) and the filtrate rendered alkaline with ammonia.

The base produced is taken up in methylene chloride and after washing with water the base is isolated. From alcohol the 1 - aza - 2,4,9 - trimethyl - 6 - diethylaminoethylamino-thioxanthone of the formula

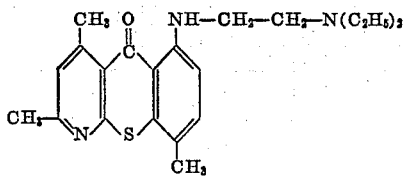

crystallizes in golden yellow fine leaflets of melting point 118–118.5° C.

The hydrochloride, prepared in the customary manner, forms orange yellow prisms of melting point 228–229° C.

The 1-aza-2,4,9-trimethyl-6-chloro-thioxanthone used as starting material can be prepared in the following manner:

33 grams of 2-chloro-3-cyano-4,6-dimethyl-pyridine with the dry sodium compound from 31.7 grams of 2-methyl-5-chloro-thiophenol are boiled under reflux for 10 hours in 150 cc. of absolute dioxane, with stirring, in a nitrogen atmosphere. Filtration with suction over "Celite" from the common salt formed is then carried out, the filtrate then evaporated and the residue taken up in methylene chloride. The methylene chloride solution is washed with dilute caustic soda solution and water, dried, evaporated and the residue recrystallized from methanol. The 4,6 - dimethyl - 3 - cyano - 2 - (5' - chloro - 2' - methyl-phenylmercapto)-pyridine melts at 101–102° C. Yield 48 grams.

28.35 grams of the nitrile are heated with stirring for 6 hours to 140–150° C. in 250 cc. of 80% sulfuric acid. The whole is then cooled to 0–10° C. and a concentrated aqueous solution of 10 grams of sodium nitrite added dropwise beneath the surface of the liquid with stirring. The freezing mixture is then removed and after the reaction mixture has attained room temperature it is heated in 1 hour to 50–60° C. Stirring is continued for about 2 hours longer at this temperature until the evolution of gas is complete. The mixture is now poured on ice, brought to pH 4 with concentrated ammonia and the carboxylic acid produced as a yellowish plastic mass is filtered off. It is dissolved with heating in dilute sodium carbonate solution and the solution filtered off from any insoluble secondary product and reprecipitated with acetic acid. The 4,6-dimethyl-3-carboxy-2-(5'-chloro-2'-methylphenylmercapto) - pyridine, when recrystallized from dilute alcohol melts at 155–156° C. Yield 22.45 grams.

22 grams of this carboxylic acid are heated for 6 hours to 160–170° C. in 400 grams of polyphosphoric acid. The melt is poured on ice and rendered alkaline with concentrated ammonia with cooling and the precipitated product produced by ring closure is taken up in methylene chloride. The 1-aza-2,4,9-trimethyl-6-chloro-thioxanthone is recrystallized from a mixture of dioxane and alcohol and forms yellowish leaflets of melting point 162–163° C. Yield 18.3 grams.

Example 6

5 grams of 1-aza-2,4,9-trimethyl-6-chloro-thioxanthone are refluxed for 5 hours with 30 cc. of γ-diethylaminopropylamine. The excess diamine is distilled off in vacuo and the residue heated with 200 cc. of 10% acetic acid, the solution filtered with suction through "Celite" to remove some insoluble by-product, and the orange-yellow filtrate rendered alkaline with 2 N-caustic soda solution.

The base which precipitates is taken up in ether, the ethereal solution washed with water, dried with sodium sulfate, and evaporated. The remaining brown-red oil (5.6 grams) crystallizes slowly and is recrystallized from a mixture of ether and petroleum ether. The yield is 4.5 grams. The resulting 1-aza-2,4,9-trimethyl-6-diethyl-aminopropylamino-thioxanthone of the formula

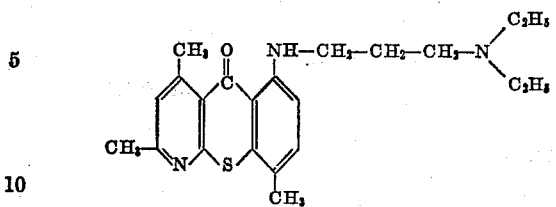

melts at 62–63° C. Its hydrochloride, obtained in the usual manner, melts at 235–236° C.

Example 7

5 grams of 1-aza-2,4,9-trimethyl-6-chloro-thioxanthone are heated to 180° C. in an oil bath for 6 hours with 10 cc. of N-(β-aminoethyl)-morpholine. The mixture is dissolved while warm in 30 cc. of glacial acetic acid, and the solution diluted with 270 cc. of hot water while being shaken. An undissolved by-product is then removed by filtering with suction through "Celite," and the clear yellow-red filtrate rendered weakly alkaline with 2 N-caustic soda solution which is added dropwise while the filtrate is being stirred and cooled with ice. The base which precipitates in the form of crystals is filtered with suction, washed with water, dried in vacuo, and recrystallized from alcohol. The resulting 1-aza-2,4,9-trimethyl-6-morpholinoethylamino-thioxanthone of the formula

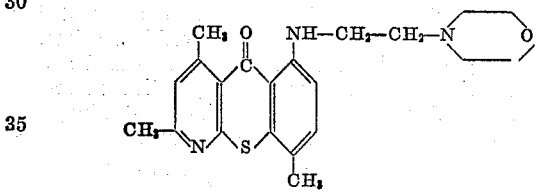

forms fine yellow needles of melting point 133–135° C. The yield is 5.5 grams. The hydrochloride obtained in the usual manner crystallizes from a mixture of alcohol and ether in the form of yellow needles of melting point 258–260° C.

Example 8

5 grams of 1-aza-2,4,9-trimethyl-6-chloro-thioxanthone are refluxed for 6 hours with 25 cc. of dimethylamino-ethylamine. After working up as described in Example 7, the base (3.1 grams), precipitated in crystalline form from the acetic acid solution with the aid of dilute caustic soda solution, is recrystallized from alcohol. The resulting 1 - azo - 2,4,9 - trimethyl - 6 - dimethylaminoethyl-amino-thioxanthone of the formula

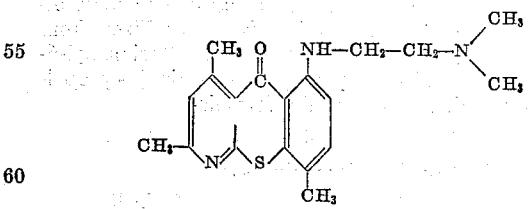

forms brown-yellow lamellae of melting point 136–137° C.

Example 9

9.65 grams of 1-aza-2,4,9-trimethyl-6-chloro-thioxanthone are heated at 160–170° C. for 18 hours with 11 grams of N-butyl-N-(β-hydroxyethyl)-amino-ethylamine and a trace of copper powder. After working up as described in Example 7 the base precipitated from the dilute acetic acid solution by means of caustic soda solution is taken up in ether, the ethereal solution washed with water, dried and evaporated. The residue (6.3 grams of crystalline base) is recrystallized from a mixture of ether and petroleum ether. The resulting 1 - aza - 2,4,9 - trimethyl - 6 - [(N -β- hydroxyethyl - N-butyl-amino)-ethylamino]-thioxanthone of the formula

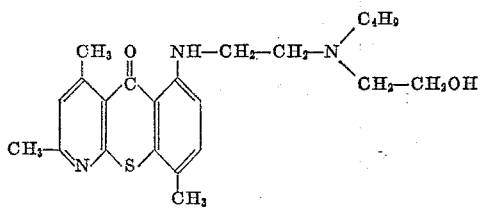

forms fine yellow needles of melting point 109–110° C. The hydrochloride, after recrystallization from a mixture of alcohol and ether, melts at 137° C. It contains 1 mol of crystal water.

*Example 10*

5 grams of 1-aza-2,4,9-trimethyl-6-chloro-thioxanthone are heated to 160–170° C. for 10 hours with 10 grams of di-n-butylamino-ethylamine. The mixture is then heated on the water bath with 100 cc. of 2 N-hydrochloric acid, some insoluble matter is removed, and the yellow-red, acid filtrate rendered alkaline with potassium carbonate. The base, which precipitates in the form of a brown-red viscous oil, is filtered with suction, taken up in ether, the ethereal solution washed several times with water, dried and evaporated. The residual brown-red oil crystallizes on the addition of acetone in the form of yellow needles of melting point 60–63° C. The base is dissolved in acetone, the calculated quantity of 1 N-hydrochloric acid is added and the deep red solution evaporated to complete dryness. The residue is dissolved in absolute, hot alcohol, the solution considerably concentrated and then mixed with absolute ether until crystallization sets in. The hydrochloride of 1-aza-2,4,9-trimethyl-6-dibutyl-aminoethylamino-thioxanthone of the formula

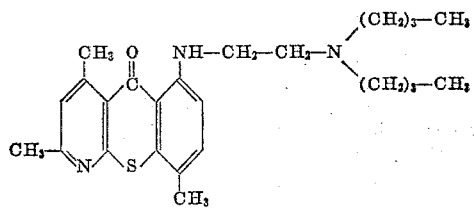

crystallizes in the form of orange yellow prisms of melting point 211–213° C. The yield is 4.8 grams.

*Example 11*

5 grams of 1-aza-2,4,9-trimethyl-6-chloro-thioxanthone are heated at 160° C. for 15 hours with 13 grams of 1-[N - ethyl - N - (β - hydroxyethyl) - amino] - propyl - 2-amine. The reaction mixture is worked up as in Example 10. The base, which is obtained in crystalline form directly from the ethereal solution, is recrystallized from acetone. The golden yellow 1-aza-2,4,9-trimethyl-6-[1' - (N - ethyl - N - β - hydroxyethyl - amino) - propyl-(2')-amino]-thioxanthone of the formula

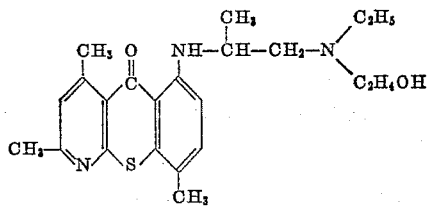

thus obtained melts at 103–105° C.

The hydrochloride prepared in the usual manner melts at 198–199° C.

What is claimed is:

1. A 1-aza-2-lower alkyl-6-(tertiary amino-lower alkyl-amino)-9-methyl-thioxanthone containing at most one further substituent in the thioxanthone ring, said substituent being a methyl group in 4-position, the tertiary-amino group of which is selected from the group consisting of amino groups disubstituted by members selected from the group consisting of lower alkyl and lower hydroxyalkyl groups and pyrrolidino-, piperidino-, and morpholino groups, and therapeutically useful acid addition salts thereof.

2. Compounds of the formula

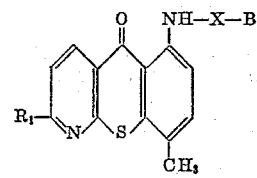

wherein $R_1$ stands for a lower alkyl group, X represents a lower alkylene radical and B a di-lower alkyl-amino group, and therapeutically useful acid addition salts thereof.

3. Compounds of the formula

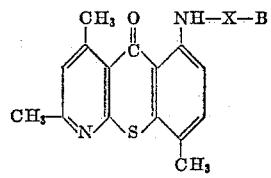

wherein X represents a lower alkylene radical and B a di-lower alkyl-amino group, and therapeutically useful acid addition salts thereof.

4. 1 - aza - 2,4,9 - trimethyl-6-diethylaminoethylamino-thioxanthone.
5. 1 - aza - 2,9-dimethyl - 6 - diethylaminoethylamino-thioxanthone.
6. 1 - aza - 2,4,9 - trimethyl - 6 - dibutylaminoethyl-amino-thioxanthone.
7. The hydrochloride of 1-aza-2,4,9-trimethyl-6-diethyl-aminoethylamino-thioxanthone.
8. 1 - aza - 2,9 - dimethyl - 6 - morpholino-ethylamino-thioxanthone.
9. 1 - aza - 2,9 - dimethyl - 6 - dimethylamino-propyl-amino-thioxanthone.
10. 1 - aza - 2 - isobutyl - 6 - diethylamino-ethylamino-9-methyl-thioxanthone.
11. The hydrochloride of 1-aza-2,9-dimethyl-6-diethyl-amino-ethylamino-thioxanthone.
12. Compounds of the formula:

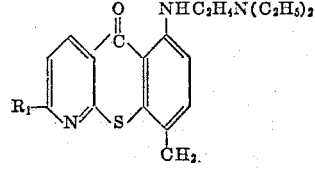

in which $R_1$ represents lower alkyl.

References Cited in the file of this patent

UNITED STATES PATENTS

| | | |
|---|---|---|
| 2,627,518 | Archer | Feb. 3, 1953 |
| 2,653,949 | Archer | Sept. 29, 1953 |
| 2,653,950 | Archer | Sept. 29, 1953 |
| 2,653,951 | Archer | Sept. 29, 1953 |
| 2,691,657 | Coombs | Oct. 12, 1954 |